Nov. 24, 1953 L. L. BILLAR 2,660,621

IDENTIFICATION CODE ON SOUND RECORDS

Filed July 14, 1950 2 Sheets-Sheet 1

INVENTOR

LOUIS L. BILLAR

BY Harvey & O'Connell

ATTORNEY

Nov. 24, 1953 L. L. BILLAR 2,660,621

IDENTIFICATION CODE ON SOUND RECORDS

Filed July 14, 1950

2 Sheets-Sheet 2

INVENTOR

LOUIS L. BILLAR

BY Darvey & O'Connell

ATTORNEY

Patented Nov. 24, 1953

2,660,621

UNITED STATES PATENT OFFICE 2,660,621

IDENTIFICATION CODE ON SOUND RECORDS

Louis L. Billar, Phoenix, Ariz.

Application July 14, 1950, Serial No. 173,725

6 Claims. (Cl. 179—100.1)

This invention relates to devices for recording on sound records one or more signals, identifying the sound source, and more particularly signals that are acoustically reproducible along with the normal reproduction from the record.

It is highly desirable in many cases, such as in recordation and reproduction of oral statements made by those participating in legal trials, committee hearings, dictographic recording and the like, to have with the reproduction of the record some appropriate signal identifying the particular person or other source of a given record, it being understood that the signal reproduction will be so arranged and selected as to cause minimum interference with the normal reproduction, and yet be sufficient for the purpose. Prior arrangements proposed along this line have many disadvantages. Among these are their general insufficiency and lack of facility in operation. In some cases the identification signal recordation must be performed by a skilled code operator, which obviously limits the use of the device and also opens the way for mistakes in formulating the different signals for the respective sources.

It is an object of this invention to provide a means by which a signal is applied in a simple manner to a sound record to identify the sound source, and which is capable of acoustic reproduction along with the normal record.

It is a further object to provide a device for applying to a sound record a source identification signal in code or multi-element form, and which can be manipulated without the necessity of the operator being skilled in core formulation.

A further object is the provision of means for automatically repeating the identification code signal applied to a sound record in connection with the recording from a single sound source.

Another object is the provision of a switching device so arranged that the identification signals are composed of the pulses of predetermined, fixed lengths so that each identification signal is recorded uniformly every time it is used.

A further object is the provision of a separate switching device for controlling the generation of the identification signal of each of several sound sources, the several switching devices being preferably mounted in a single casing.

Other and further objects of my invention and of the invention itself will be better understood from the following description of an embodiment thereof, reference being made to the drawing, in which.

Figure 7:
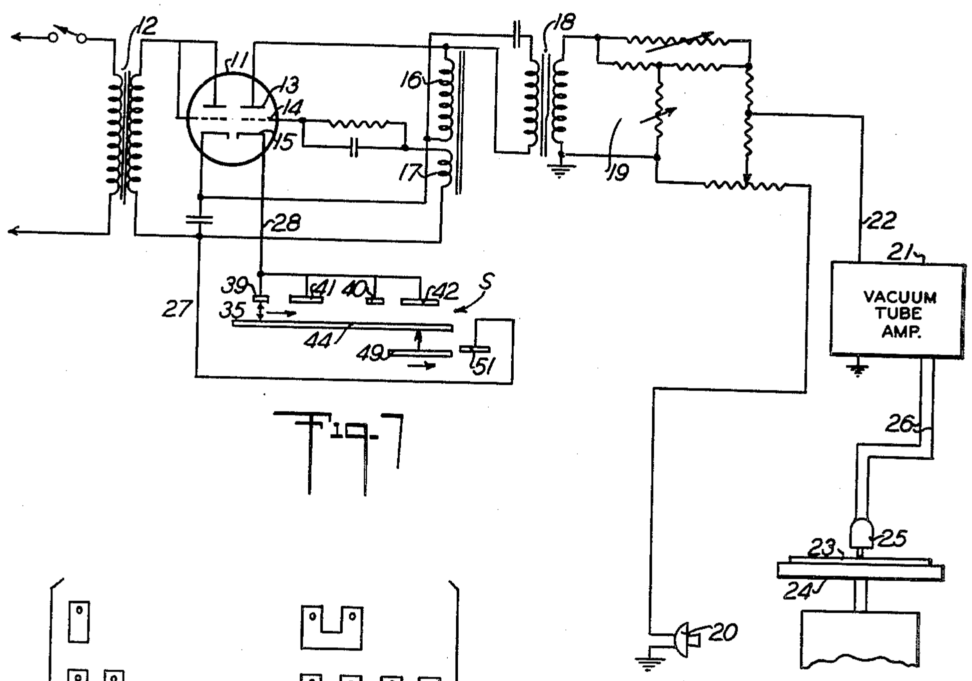
Figure 7 is a schematic circuit diagram showing the invention as applied to recording on a record having a spiral sound groove.

Referring to Figure 7, 11 denotes a double triode having a rectifier portion to which A. C. power is applied by a transformer 12 and an oscillator portion comprising anode 13, grid 14 and cathode 15. Feedback between anode and grid circuits is provided by coils 16, 17 to cause audio oscillations whenever a switch S is closed to complete the anode-cathode circuit. The circuit constants are selected to generate oscillations preferably of a frequency somewhat higher than the tones of the normal speaking voice, but the frequency may be slightly below the usual voice frequencies, if desired. Although a vacuum tube has been illustrated as the source of the audio oscillations, it will be understood that a buzzer, bell or other audio source may be used instead. The audio output is applied by transformer 18 to an insertion network 19 to which the speech or other signal to be recorded is also applied by a microphone 20. The input terminals of a vacuum tube amplifier are connected to circuit 19 by a circuit comprising lead 22 so that both the speech and the identifying signal oscillations to be recorded are amplified by amplifier 21. As shown by way of example, the recording is effected on a spirally grooved record 23 supported on a rotatable turntable 24 by means of the stylus of a recording unit 25 to whose terminals the output of amplifier 21 is connected by the leads 26. Instead of a spirally grooved record, it will be understood that a wire, tape or other means may be used, the recording unit 25 being modified to effect the recording magnetically, or in other suitable manner.

Figure 1:
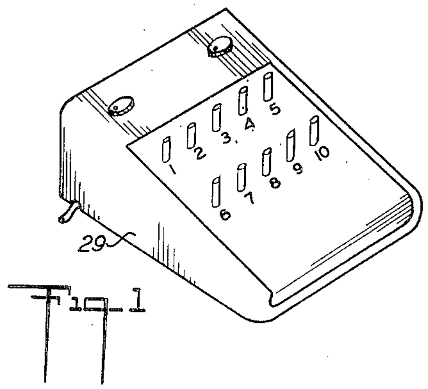
Figure 1 is a perspective view of a casing in which the switches for controlling the identification signals are mounted and of keys for controlling the switches.

A plurality of switches S are provided, the several contacts of these switches being connected to the oscillator by leads 27, 28. Referring to Figure 1, a casing 29 is shown in which the switches are mounted, each switch being operated by a depressible key, the keys being numbered from 1 to 10. The unit illustrated is thus suitable for identifying ten different sound sources. The detail construction of the switch having key 1 is shown in Figures 2 to 5, the key being attached to the upper end of a push rod 30 of insulation material slidable in upper and lower support panels 31, 32. At their ends the panels 31 and 32 are connected together by struts 33 (only one being shown) so that the members 31, 32, 33 form a framework for supporting the switches within casing 29. Secured to rod 30 and projecting from both sides thereof is an arm 34 to whose left end is secured a metallic switch blade 35. A compression spring 36 surrounds rod 30, the upper end of spring 36 abutting arm 34 and its lower end abutting panel 32. The plunger 37 of a dashpot 38 is connected to the lower end of push rod 30 so that upon depression of key 1 by the recording operator, push rod 30 and its associated switch blade 35 are returned to their initial, upper positions at a uniform speed under the influence of spring 36 and dashpot 38.

One end of switch blade 35 is adapted to wipe against a pair of narrow contacts 39, 40 and a pair of broad contacts 41, 42, these metallic contacts being supported on a strip 43 of insulation material whose upper and lower ends are secured to panels 31 and 32 respectively. The opposite end of switch blade 35 is adapted to wipe against an elongated contact 44 supported on a strip 45 of insulation material whose upper and lower ends are secured to panels 31 and 32 respectively. Mounted for sliding movement in panels 31, 32 is a slide 46 of insulation material, which has a pair of spaced projecting fingers 47, 48 between which the right hand end of arm 34 is adapted to move and which it engages to move slide 46. Slide 46 has secured to it a generally U-shaped switch blade 49, the end of whose short leg 50 is arranged to wipe against switch contact 44 and also another contact 51 which is secured to strip 45. As shown in Figure 7, switch contacts 39, 40, 41 and 42 are connected to lead 28 and contact 51 to lead 27.

Figures 2, 3, 4, 5:
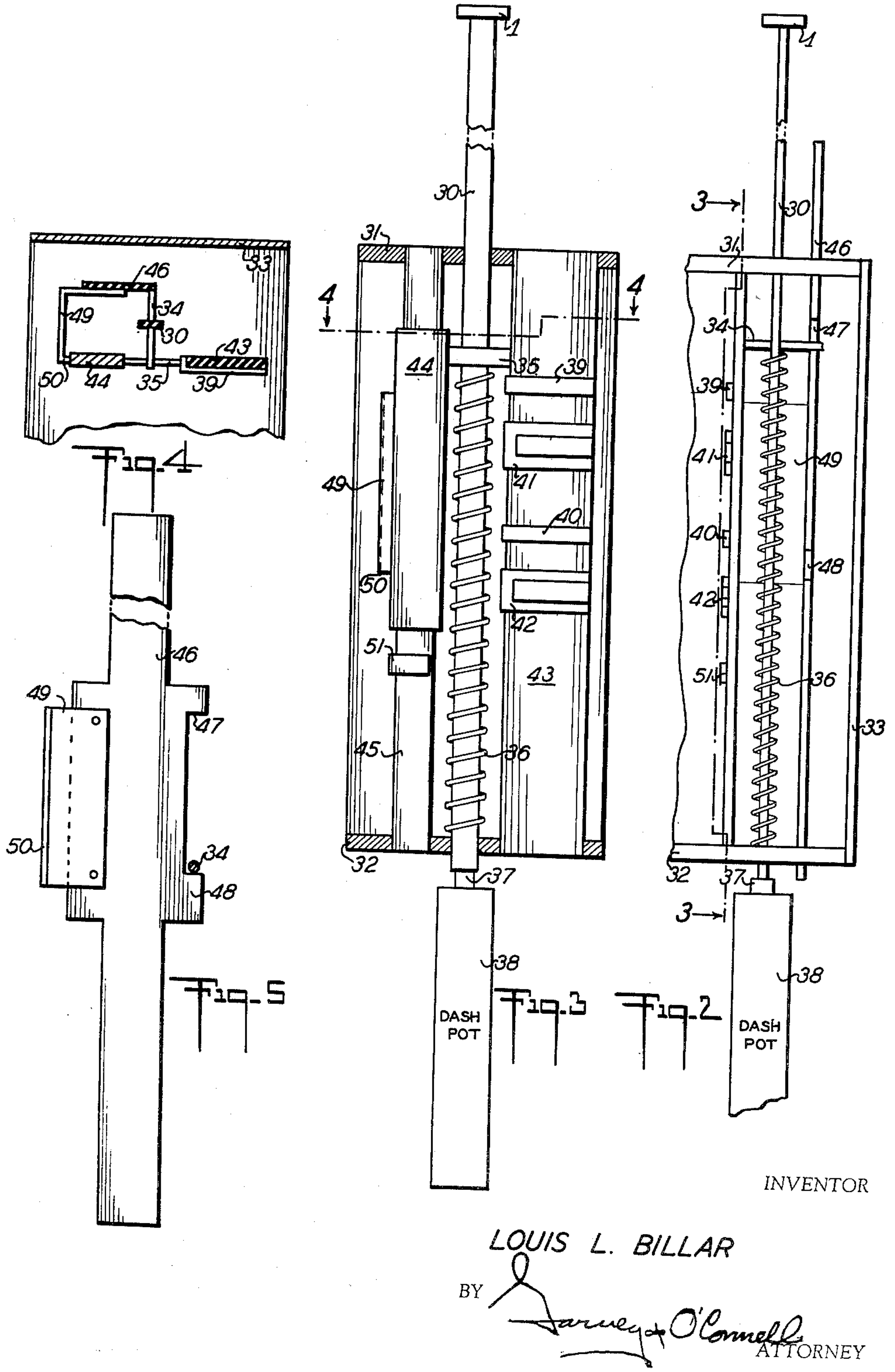
Figure 2 is a view in elevation of one of the switches and its associated operating means.
Figure 3 is a sectional view of the switch and operating means taken on line 3—3 of Figure 2.
Figure 4 is a section of the switch of Figure 3 taken on line 4—4 thereof, certain parts being omitted for clarity.
Figure 5 is a side view of one of the operating parts of the switch.

In the operation of recording speech of a person before microphone 23, the recording operator depresses, say, key number 3 which causes the automatic recording of his identifying signal along with his speech. As key 3 and switch blade 35 is moving down, the oscillator circuit is open. While blade 35 is moving from contact 39 to contact 42, actuating arm 34 moves from finger 47 towards finger 48 which it engages to move slide 46 downward and cause its switch blade 49 to engage fixed contact 51 shortly after blade 35 has left fixed contact 42. With key 3 in its lowest position, an electrical circuit is thus established between lead 27 and contact 44 (Figs. 3 and 7). As the key and switch blade 35 move up at a uniform speed under the joint influence of spring 36 and dashpot 38, the oscillator circuit is completed while blade 35 is passing along contacts 42, 40, 41 and 39 successively. The oscillations generated form dash and dot identifying impulses which are recorded while blade 35 is moving along contacts 42 and 40, identical impulses being repeated and recorded while blade 35 is moving along contacts 41 and 39. Just after the impulses have been recorded the oscillator circuit is broken by switch blade 49 being separated from contact 51 due to the engagement of arm 34 with finger 47 and the movement of slide 46 to its initial position. By the omission of contacts 41 and 39, it will be obvious that the dash and dot identifying signal associated with key number 3 will be recorded only once upon the depression of the key.

Figure 6:
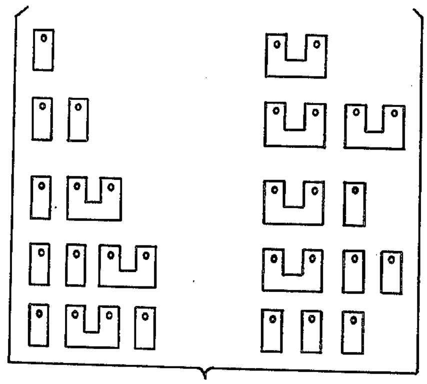
Figure 6 is a view showing switch contacts assembled in different ways to produce different identification signals.

The other switches have the same construction as above described except as to the number and arrangement of the contacts on strip 43. A number of arrangements of narrow and wide contacts are illustrated in Figure 6 to produce identifying signals of several combinations of dots and dashes. Instead of moving vertically, the switch may be arranged so that its key and other movable parts move horizontally or the switch key may be mounted for rotation in which case the several switch contacts would be arranged along circular arcs. In some cases, it may be arranged to have the identifying signals produced on the inward or depression movement of the key with any suitable speed governor.

While I have described above the principles of my invention in connection with specific apparatus, it is to be clearly understood that this description is made only by way of example and not as a limitation on the scope of the invention as above set forth in the objects thereof and the accompanying claims.

What is claimed is:

1. Means for recording and identifying sound from a plurality of sound sources consecutively on a reproducible record, a source of audio frequency oscillations, a control circuit for said source of audio frequency oscillations including a plurality of spaced switch contacts operable to record on the record a plurality of pulses of oscillations from said audio frequency source during the recording from one of said sound sources, and automatic means operable to actuate said switch contacts by a single manual movement in one direction for causing said switch contacts to move at a uniform speed during the recording of said pulses to apply pulses recorded along with the recording from one of the sound sources of definite predetermined length so as to provide means for positively identifying said one sound source.

2. Means for identifying respective sounds from a plurality of sound sources comprising, in combination, means for recording the sounds consecutively on a reproducible sound record, means for generating audio oscillations of constant frequency, unidirectional manually operable means including a switch, automatic means to return said switch from manual movement to cause the oscillations of said generating means to be recorded on the record for one or more definite time intervals during the recording of the sound from one of said sound sources, unidirectional manually operable means including a second switch and automatic means to return said second switch from manual movement to cause the oscillations of said generating means to be recorded as a different signal on the record for one or more definite time intervals during the recording of the sound from a second of said sound sources.

3. In a sound recording device for identifying respective statements of a plurality of speakers simultaneously with recording of their voices upon a reproducible sound record including apparatus having a stylus for superimposing upon said record to identify each particular speaker signals of varying duration and of constant frequency comprising an audio oscillator, means for connecting the output from said audio oscillator to actuate the stylus of record producing apparatus, microphone actuated means to receive and actuate said stylus from the sounds uttered by a plurality of speakers, a feedback circuit in said audio oscillator, means for automatically interrupting and energizing said feedback circuit in a distinct predetermined manner for each speaker recorded on said record producing apparatus, including a master control switch box, a plurality of switch actuating push buttons in said box, one for each speaker to be recorded, a series of differently spaced contacts for each of said buttons connected to one side of said feed back circuit, a contact blade connected to each of said buttons and operatively engaging the contacts associated with said button, and control means for limiting the relative rate of movement of said contact blade and said contacts.

4. In a sound recording device for identifying respective statements of a plurality of speakers simultaneously with recording of their voices upon a reproducible sound record including apparatus having a stylus for super-imposing upon said record to identify each particular speaker signals of varying duration and to constant frequency comprising an audio oscillator, means for connecting the output from said audio oscillator to actuate the stylus of record producing apparatus, microphone actuated means to receive and actuate said stylus from the sounds uttered by a plurality of speakers, a feed back circuit in said audio oscillator, means for automatically interrupting and energizing said feedback circuit in a distinct predetermined manner for each speaker recorded on said record producing apparatus, including a master control switch box, a plurality of switch actuating push buttons in said box, one for each speaker to be recorded, a series of differently spaced contacts for each of said buttons connected to one side of said feed back circuit, a contact blade connected to each of said buttons and operatively engaging the contacts associated with said button, control means for limiting the relative rate of movement of said contact blade and said contacts, said last mentioned control means including a bias spring yieldingly opposing manual application of pressure to said buttons, and dashpot means for controlling the movement of said spring upon the release of manual pressure from said buttons.

5. In a sound recording device for identifying respective statements of a plurality of speakers simultaneously with recording of their voices upon a reproducible sound record including apparatus having a stylus for super-imposing upon said record to identify each particular speaker signals of varying duration and of constant frequency comprising an audio oscillator, means for connecting the output from said audio oscillator to actuate the stylus of record producing apparatus, microphone actuated means to receive and actuate said stylus from the sounds uttered by a plurality of speakers, a feed back circuit in said audio oscillator, means for automatically interrupting and energizing said feed back circuit in a distinct predetermined manner for each speaker recorded on said record producing apparatus, including a master control switch box, a plurality of switch actuating push buttons in said box, one for each speaker to be recorded, a series of differently spaced contacts for each of said buttons connected to one side of said feed back circuit, a contact blade connected to each of said buttons and operatively engaging the contacts associated with said button, control means for limiting the relative rate of movement of said contact blade and said contacts, said last mentioned control means including a bias spring yieldingly opposing manual application of pressure to said buttons, dashpot means for controlling the movement of said spring upon the release of manual pressure from said buttons, and further switch means connected in series in said feed back circuit with said contacts and blade for each push button, means for closing said further switch means when said push button is moved to a predetermined position against said force of said spring, and means for opening said further switch means upon return of said push button under spring and dashpot control to a predetermined starting position.

6. A sound recording apparatus including a recording medium, means for applying a plurality of sound sources to said medium, a control box for transferring visual identification of each of said sound sources as a super-imposed distinctive audio control signal on said recording medium in conjunction with the actual recording of each individual sound source including a plurality of push buttons, one for each individual sound source to be identified, and switch means actated by a single momentary depression of one of said push buttons to super-impose a distinctive audio characteristic on said recording medium identifying that portion of the record.

LOUIS L. BILLAR.

References Cited in the file of this patent

UNITED STATES PATENTS

| Number | Name | Date |
|---|---|---|
| 1,609,185 | Pastor | Nov. 30, 1926 |
| 1,909,765 | Jenkins | May 16, 1933 |
| 2,063,830 | Rouse | Dec. 8, 1936 |
| 2,110,090 | Ligh | Mar. 1, 1938 |
| 2,330,135 | Meincke | Sept. 21, 1943 |
| 2,398,019 | MacKenzie | Apr. 9, 1946 |
| 2,407,889 | MacKenzie | Sept. 17, 1946 |